United States Patent
Osburn, III

(10) Patent No.: US 9,596,090 B1
(45) Date of Patent: Mar. 14, 2017

(54) METHOD FOR CONTROLLING DATA ACQUISITION FOR A PLURALITY OF FIELD DEVICES

(71) Applicant: DJ INVENTIONS, LLC, Houston, TX (US)

(72) Inventor: Douglas C. Osburn, III, Houston, TX (US)

(73) Assignee: DJ INVENTIONS, LLC, Houston, TX (US)

( * ) Notice: Subject to any disclaimer, the term of this patent is extended or adjusted under 35 U.S.C. 154(b) by 0 days.

(21) Appl. No.: 15/139,218

(22) Filed: Apr. 26, 2016

Related U.S. Application Data

(63) Continuation-in-part of application No. 13/590,271, filed on Aug. 21, 2012, which is a
(Continued)

(51) Int. Cl.
*H04L 9/32* (2006.01)
*H04L 29/06* (2006.01)
(Continued)

(52) U.S. Cl.
CPC .......... *H04L 9/3268* (2013.01); *H04L 9/0866* (2013.01); *H04L 9/30* (2013.01); *H04L 41/0654* (2013.01); *H04L 63/0435* (2013.01); *H04L 63/06* (2013.01); *H04L 67/32* (2013.01); *H04L 67/42* (2013.01); *G05B 2219/32404* (2013.01)

(58) Field of Classification Search
CPC ... H04L 9/3268; H04L 41/0654; H04L 63/06; H04L 67/32; H04L 63/0435; H04L 9/30; H04L 67/42; H04L 9/0866; G05B 2219/32404
See application file for complete search history.

(56) References Cited

U.S. PATENT DOCUMENTS

| 5,122,948 A | 6/1992 | Zapolin |
| 5,638,378 A | 6/1997 | Scop et al. |

(Continued)

OTHER PUBLICATIONS

Patel et al., "Improving the Cyber Security of SCADA Communication Networks", Jul. 2008, Communications of the ACM, vol. 22, No. 7, pp. 139-142.*

*Primary Examiner* — Matthew Smithers
(74) *Attorney, Agent, or Firm* — Buskop Law Group, PC; Wendy Buskop

(57) ABSTRACT

A method for online licensing of field devices using an enterprise server with a processor and a data storage, which communicate via a network to the field devices optionally through at least one intelligent cryptographic module. The method receives a request for a license online from a client device for bidirectional communication between field devices and the enterprise server. The method generates a license and a symmetric encryption key. The method generates an object with a communication protocol of the field devices, and a primary communication path. The object contains a schedule configuration and time synchronization configuration and settings. The method then initiates communication, provides a secondary communication path if the primary communication paths fails, and simultaneously collects data by type and value from the field devices and publishes a report.

14 Claims, 12 Drawing Sheets

Related U.S. Application Data continuation-in-part of application No. 13/231,853, filed on Sep. 13, 2011, which is a continuation-in-part of application No. 12/098,545, filed on Apr. 7, 2008, now Pat. No. 8,019,546, which is a continuation of application No. 11/345,759, filed on Feb. 2, 2006, now abandoned, and a continuation-in-part of application No. 11/050,170, filed on Feb. 3, 2005, now Pat. No. 7,587,481, and a continuation-in-part of application No. 11/050,516, filed on Feb. 3, 2005, now abandoned, said application No. 11/050,170 is a continuation-in-part of application No. 09/826,578, filed on Apr. 5, 2001, now Pat. No. 6,950,851.

(60) Provisional application No. 60/649,795, filed on Feb. 3, 2005.

(51) Int. Cl.
*H04L 29/08* (2006.01)
*H04L 9/30* (2006.01)
*H04L 9/08* (2006.01)
*H04L 12/24* (2006.01)

(56) References Cited

U.S. PATENT DOCUMENTS

| | | |
|---|---|---|
| 5,719,771 A | 2/1998 | Buck et al. |
| 5,745,384 A | 4/1998 | Lanzerotti et al. |
| 5,751,809 A | 5/1998 | Davis et al. |
| 5,794,009 A | 8/1998 | Coleman et al. |
| 5,812,394 A | 9/1998 | Lewis et al. |
| 6,032,154 A | 2/2000 | Coleman et al. |
| 6,411,987 B1 | 6/2002 | Steger et al. |
| 6,460,140 B1 | 10/2002 | Schoch et al. |
| 6,628,992 B2 | 9/2003 | Osburn, III |
| 6,658,349 B2 | 12/2003 | Cline |
| 6,687,573 B2 | 2/2004 | Egolf et al. |
| 6,697,948 B1 | 2/2004 | Rabin et al. |
| 6,751,562 B1 | 6/2004 | Blackett et al. |
| 6,950,851 B2 | 9/2005 | Osburn, III |
| 6,961,753 B1* | 11/2005 | Osburn, III .............. H04L 29/06 700/28 |
| 7,020,532 B2* | 3/2006 | Johnson ............... G05B 19/042 700/1 |
| 7,073,183 B2 | 7/2006 | Hekizono |
| 7,225,248 B1 | 5/2007 | Osburn, III |
| 7,286,914 B2 | 10/2007 | Cerchione et al. |
| 7,587,481 B1* | 9/2009 | Osburn, III ......... G05B 19/4183 709/203 |
| 7,646,298 B1 | 1/2010 | Osburn, III et al. |
| 7,673,337 B1 | 3/2010 | Osburn, III et al. |
| 7,673,338 B1* | 3/2010 | Osburn, III ......... H04L 63/0485 380/255 |
| 7,747,710 B1 | 6/2010 | Osburn, III et al. |
| 8,069,242 B2 | 11/2011 | Hadar et al. |
| 8,204,717 B2 | 6/2012 | McLaughlin et al. |
| 2002/0091645 A1 | 7/2002 | Tohyama |
| 2002/0161908 A1 | 10/2002 | Benitez et al. |
| 2003/0233573 A1* | 12/2003 | Phinney ................. G06F 21/606 726/14 |
| 2004/0098348 A1* | 5/2004 | Kawasaki ............... G06F 21/10 705/59 |
| 2004/0217900 A1 | 11/2004 | Martin et al. |
| 2004/0244265 A1 | 12/2004 | Miyata et al. |
| 2005/0138120 A1 | 6/2005 | Gundersen et al. |
| 2006/0143350 A1 | 6/2006 | Miloushev et al. |
| 2009/0138975 A1* | 5/2009 | Richardson ............. G06F 21/10 726/32 |
| 2009/0210071 A1 | 8/2009 | Agrusa et al. |
| 2009/0282146 A1* | 11/2009 | Nakano ................. G06F 21/105 709/224 |
| 2010/0050017 A1* | 2/2010 | Almadi ................. G01V 11/002 714/15 |
| 2010/0299517 A1* | 11/2010 | Jukic ................... H04L 63/0823 713/150 |
| 2011/0040809 A1* | 2/2011 | Spanier ................. G01D 4/004 707/821 |
| 2013/0124859 A1* | 5/2013 | Pestoni ................. H04L 9/0825 713/163 |
| 2013/0333014 A1 | 12/2013 | Batara |
| 2015/0143539 A1* | 5/2015 | Feng ..................... G06F 21/10 726/28 |

\* cited by examiner

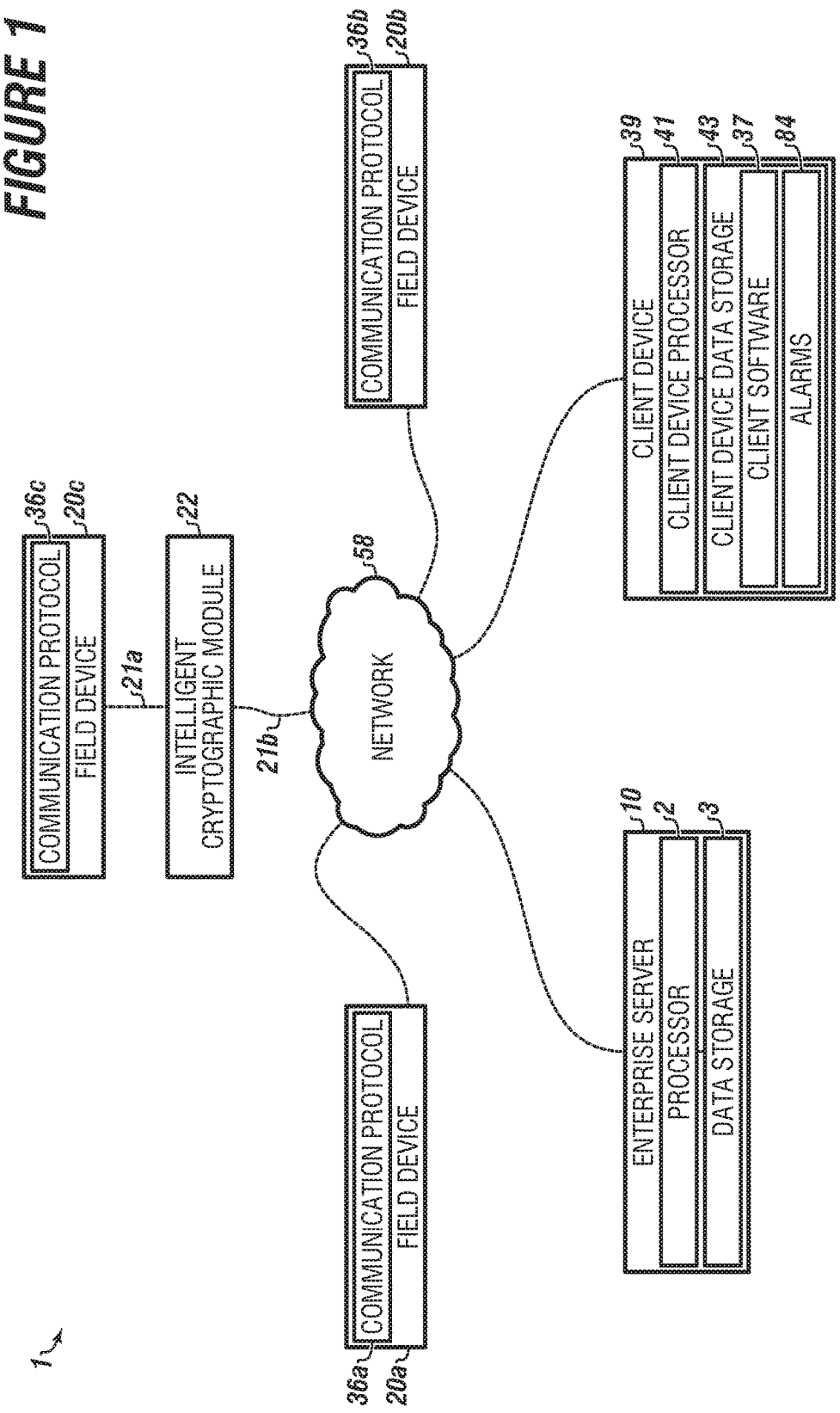

FIGURE 11

| | |
|---|---|
| CONNECTING AN ENTERPRISE SERVER TO A NETWORK | 5000 |
| CONNECTING A PLURALITY OF FIELD DEVICES TO THE NETWORK | 5002 |
| RECEIVING AND STORING A REQUEST FOR A LICENSE IN THE ENTERPRISE SERVER | 5004 |
| GENERATING A LICENSE IN RESPONSE TO THE REQUEST FOR THE LICENSE AND STORING THE LICENSE IN THE DATA STORAGE | 5006 |
| GENERATING A SYMMETRIC ENCRYPTION KEY USING THE DEVICE COUNT VALUE, THE INDICATION OF TYPE OF DATA AND THE VALUE OF THE LICENSE, AND STORING THE SYMMETRIC ENCRYPTION KEY IN THE DATA STORAGE | 5008 |
| GENERATING AN OBJECT IN THE ENTERPRISE SERVER FOR EACH OF THE PLURALITY OF FIELD DEVICES AND STORING EACH OBJECT IN THE DATA STORAGE | 5010 |
| INITIATING COMMUNICATION WITH EACH FIELD DEVICE SIMULTANEOUSLY THROUGH EACH OBJECT | 5012 |
| IDENTIFYING IF COMMUNICATION BETWEEN THE ENTERPRISE SERVER AND EACH FIELD DEVICE SUCCEEDS OR FAILS AND OPTIONALLY SWITCHING CONNECTION FROM A PRIMARY COMMUNICATION PATH TO A SECONDARY COMMUNICATION PATH BETWEEN EACH OBJECT AND EACH FIELD DEVICE DEPENDING ON A SUCCESS OR A FAILURE OF THE COMMUNICATION | 5014 |
| COMMUNICATING TO A PORTION OF THE PLURALITY OF FIELD DEVICES FROM AT LEAST ONE OBJECT THROUGH AT LEAST ONE INTELLIGENT CRYPTOGRAPHIC MODULE PROVIDING AN ENCRYPTED COMMUNICATION LINK BETWEEN THE OBJECT AND EACH FIELD DEVICE COMMUNICATING WITH THE INTELLIGENT CRYPTOGRAPHIC MODULE | 5016 |
| TRANSMITTING A PASS OR FAIL COMMUNICATION FROM EACH OBJECT TO EACH OF THE PLURALITY OF FIELD DEVICES EITHER ON DEMAND OR USING THE SCHEDULE CONFIGURATION | 5018 |
| PUBLISHING A REPORT BASED ON COMMUNICATION PERFORMANCE BETWEEN EACH OF THE PLURALITY OF FIELD DEVICES AND EACH OBJECT | 5020 |
| PUBLISHING HISTORICAL DATA BASED ON A TYPE OF DATA COLLECTED BY EACH OF THE PLURALITY OF FIELD DEVICES | 5022 |
| TRANSMITTING A COMMAND FROM EACH OBJECT TO EACH FIELD DEVICE, WHEREIN THE COMMAND COMPRISES AT LEAST ONE OF: AN ACTUATION COMMAND, A DEACTIVATION COMMAND, A CONFIGURATION COMMAND FOR ONLINE CONFIGURATION, A RECONFIGURATION COMMAND FOR ONLINE RECONFIGURATION, AND WHEREIN EACH COMMAND IS AT LEAST ONE OF: AN ENCRYPTED COMMAND AND A COMMAND WITHOUT ENCRYPTION | 5024 |

METHOD FOR CONTROLLING DATA ACQUISITION FOR A PLURALITY OF FIELD DEVICES

CROSS REFERENCE TO RELATED APPLICATIONS

The present application is a Continuation in Part of application U.S. patent application Ser. No. 13/590,271 filed on Aug. 21, 2012, which is a Continuation in Part of U.S. patent application Ser. No. 13/231,853 filed on Sep. 13, 2011, which is a Continuation in Part of U.S. patent application Ser. No. 12/098,545 filed on Apr. 7, 2008, which issued as U.S. Pat. No. 8,019,546 on Sep. 13, 2011, which is a Continuation of U.S. patent application Ser. No. 11/345,759 filed Feb. 2, 2006, now abandoned, which claims priority to and the benefit of US Provisional Patent Application No. 60/649,795, filed on Feb. 3, 2005. U.S. patent application Ser. No. 12/098,545 filed on Apr. 7, 2008 is a Continuation in Part of Ser. No. 11/050,170 filed on Feb. 3, 2005, which issued as U.S. Pat. No. 7,587,481 on Sep. 8, 2009 and is a Continuation in Part of U.S. patent application Ser. No. 11/050,516 filed on Feb. 3, 2005, now abandoned, and both are Continuation in Part of U.S. patent application Ser. No. 09/826,578, filed on Apr. 5, 2001, which issued as U.S. Pat. No. 6,950,851 on Sep. 27, 2005. These references are incorporated herein in their entirety.

FIELD

The present embodiments generally relate to a method for online licensing of field devices while controlling data acquisition using a communication and configuration system with an enterprise server and object generated by the enterprise server further using a symmetric encryption key.

BACKGROUND

The automation industry has had major developments in the implementation of a communication and configuration system or a supervisory control and data acquisition (SCADA) monitoring and control system.

A need has long existed for a method for online licensing of field devices which uses small personal computers or "PCs" to communicate with a communication and configuration system or a supervisory control and data acquisition system that has cryptographic modules and encrypts securely while performing online licensing.

The current embodiments meet these needs.

BRIEF DESCRIPTION OF THE DRAWINGS

The detailed description will be better understood in conjunction with the accompanying drawings as follows:

FIG. 1 shows a schematic of communication and configuration equipment usable with one or more embodiments of the method.

FIG. 11 depicts steps of the method according to one or more embodiments.

Figure 2A:
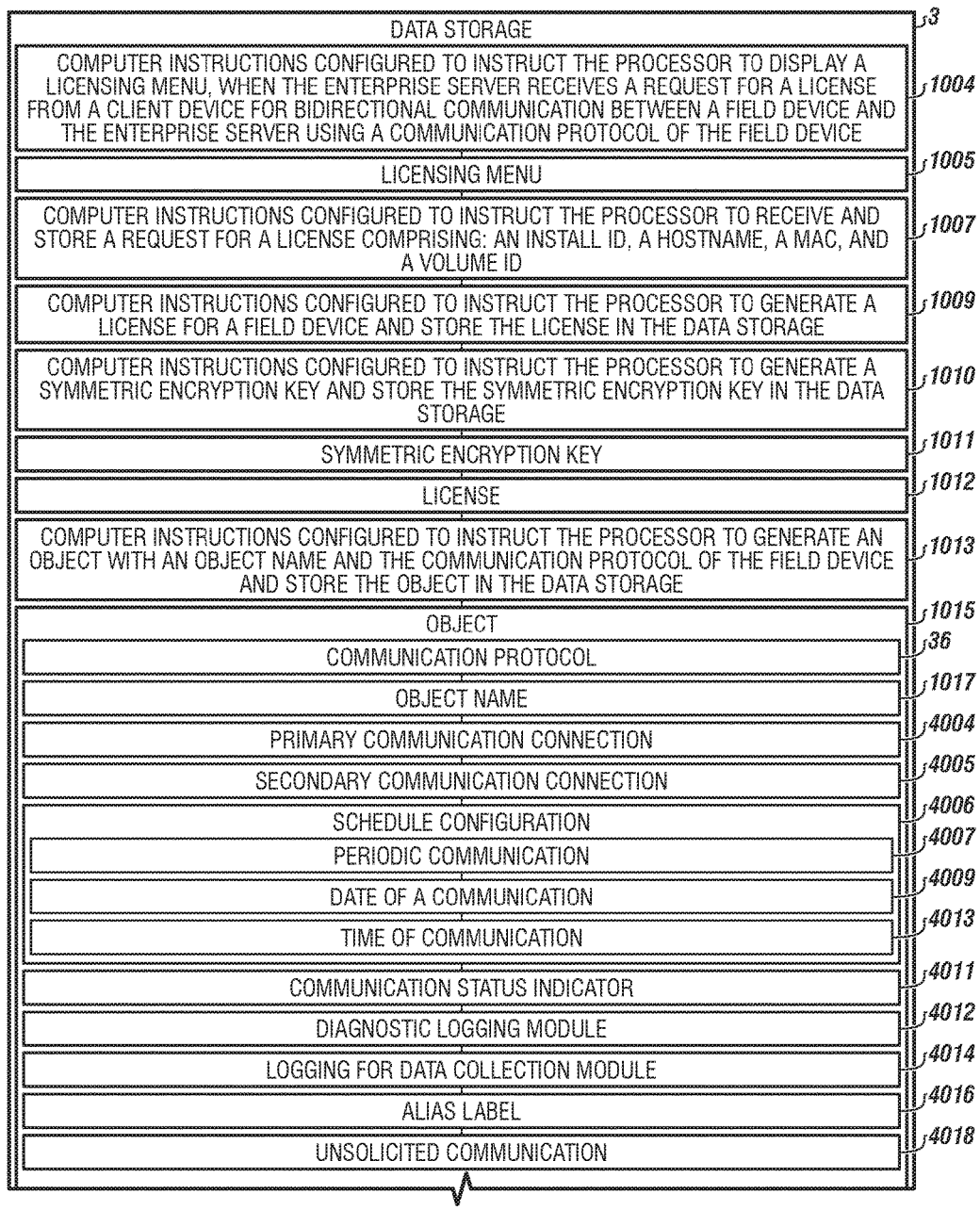
FIGS. 2A-2B show a diagram of the data storage of the enterprise server usable with one or more embodiments of the method.

The embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

A vital part of any system utilized for process control, data acquisition, or alarm detection and notification, is the initial communication and periodic point-to-point communication of the system, including the process input values, the database, the displays and the like. Such a communication procedure is associated with a SCADA system, which in its most generic definition is essentially a process control system.

The components of a typical SCADA system can include a SCADA device and one or more remotely connected intelligent electronic devices, which can be field devices or an intelligent cryptographic module.

As used herein, the term SCADA device can be a collection of electronic equipment, including a computer based controller, which can be a server, also termed the "enterprise server" that is used to remotely monitor communication and/or control the operation of one or more remote terminal units and remote sensing devices. In general, the enterprise server is remotely located away from the sensors collecting data or metering data, thereby presenting many SCADA system communication difficulties.

Communication for a SCADA system traditionally has been extremely time consuming and labor intensive and has not involved cryptographic modules with control software that allows a control system to add or delete field devices and license additional field devices simultaneously while continuing to operate the entire SCADA system.

A need exists for method of online licensing using a SCADA system with a cryptographic module and an ability to license automatically adding and deleting field devices while the entire system continues to run in which the field devices are attached while maintaining highly accurate and detailed communication procedures and additionally allowing online configuration and reconfiguration of the field devices from the SCADA controller.

The term "SCADA" as used herein can refer to a supervisory control and data acquisition system or a communication and configuration system. The term "ARME" as used herein can refer to the configuration or maintenance tool for the system. ARME is an OPC client that communicates through the AES, which allows various devices to be remotely reconfigured after deployment. OPC MESSENGER™ combines with the AES to provide a data acquisition front end for relational databases. The term "OPC MESSENGER™" as used herein can refer to an AUTOS OL™ Connection, which is a data acquisition front end connection for databases. The term "GEL" as used herein can refer to a generic encapsulation layer.

The present embodiments generally relate to a method for controlling data acquisition using a communication and configuration system. The system for controlling data acquisition using a communication and configuration system can include an enterprise server with online configurable communication server software.

The method can use a configurable server interface that communicates with an enterprise server with a processor and a data storage.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

In addition, the method can use a configurable protocol interface and a configurable communication connection.

The method can include the data storage of the enterprise server, which can have computer instructions to use integrated online licensing software to create a license for the online configurable communication server software simultaneously, while the online configurable communication server software monitors, commands, and controls at least one device, cryptographic module, or combinations thereof, without stopping operational functions of the enterprise server, online devices, online cryptographic modules, or combinations of those elements.

Communication software links the enterprise server with a plurality of devices, cryptographic modules, or combinations thereof, and configuration software in the enterprise server for configuring and reconfiguring one or more of the devices, the cryptographic modules, one or more remote terminal units in the devices, or combinations thereof while allowing the overall system to continue to operate.

The communication software can be adapted to simultaneously handle multiple types of telemetry and different device protocols associated with the devices, cryptographic modules, or combinations thereof.

The device protocols usable in the method can include AlNet, BSAP, Camp, CANet, CSNet, DF1, DNP3, DSI, Eagle, FlowAutomation, GASMicro, HP48000, impacc, Mercor, Modbus, Multilin, Opto, Pccu, ReynoldsCDR, ReynoldsLVC, ROC, S3, and TGP.

The method for controlling data acquisition can use a communication and configuration system, which can be a supervisory control and data acquisition system.

The communication and configuration system can include an enterprise server with an online configurable communication server software with an integrated online licensing software running on random access memory in a computer, for monitoring at least one device, a cryptographic module, or combinations thereof, while simultaneously commanding, controlling, and online configuring the at least one device without stopping operational functions of the enterprise server.

The enterprise server can include a configurable server interface for receiving a client request from a client application requesting status and measurement data on the at least one device, the cryptographic module, or combinations thereof without stopping operational functions of the enterprise server.

The enterprise server can also include a configurable protocol interface in communication with the online configurable communication server software for building a message for each device, the cryptographic module, or combinations thereof. The configurable protocol interface can use at least one of a plurality of device protocols for each device or cryptographic module protocols without stopping operational functions of the enterprise server.

The method can have a configurable connection interface within the enterprise server for connecting to each device, cryptographic module, or combinations thereof. The configurable connection interface can enable a message to be transmitted to each device, cryptographic module, or combinations thereof, and receive status and measurement data from each device, each cryptographic module, or combinations thereof, and transmit the status and measurement data to the configurable server interface using at least one of the plurality of device protocols without stopping operational functions of the enterprise server.

The enterprise server can use the integrated online licensing software to automatically create a customized license for the online configurable communication server software simultaneously while the online configurable communication server software monitors commands and controls at least one device, cryptographic module, or combinations thereof, without stopping operational functions of the enterprise server, at least one device, the cryptographic module, or combinations thereof.

The enterprise server can connect to a secondary device within each device. The secondary device can be a supervisory control and data acquisition (SCADA) device a metering device, a programmable logic controller (PLC), a programmable controller, a remote terminal unit, or combinations thereof.

The method can include using the enterprise server, which contains configuration software for configuring and reconfiguring one or more of the devices, the cryptographic modules, the remote terminal units, or combinations thereof. The configuration software can provide commands communicated while allowing the system to continue to operate.

The method can communicate to field devices, which can contain a remote terminal unit (RTU).

The RTU can include a sensor that continuously collects information about oceanic conditions. Examples of sensors include pressure sensors, temperature sensors, salinity sensors, transducers, anemometers, and combinations thereof.

The remote terminal unit can include a physical sensor that measures physical characteristics.

The remote terminal can include a state sensor that measures changes in state of a target of the device.

The remote terminal can include computer instructions for transmission of measured physical characteristics by one of the devices, measured changes in state by one of the devices, or combinations thereof, via telemetry using a network.

The RTU can further include an analog-to-digital converter (ADC) for measuring the physical data collected by the sensors and can convert the information into a digital representation of the collected oceanic information.

The RTU can include a memory area for storing digital representations and a processor in communication with the ADC and the memory area.

The processor can operate using digital representations according to a predetermined function. The processor can selectively move the digital representations to the memory area.

The RTU can include a command register for storing communication commands. The command register can be in communication with the processor. The processor can move the digital representations to the memory area when the command register contains an enabling communication command.

A bidirectional port can be included in the RTU and in communication with the AES and enterprise server for transmitting the digital representations to the enterprise server from the RTU via the AES.

The method can use communications software (AES) that can link the enterprise server to the RTU in one or more devices. The communication software can be used to link a second RTU of a secondary device to the first RTU of a first device in an embodiment. Any or all of the RTUs can be in communication with the communication software (AES) in various known manners (for example, by satellite signals, acoustic signals, radio frequency, or combinations thereof).

In an embodiment, the AES can provide the RTU with simulation or diagnostic instructions, so the RTU can run tests without the need for an operator or expensive test equipment to inject a new configuration of a RTU into the SCADA system. Moreover, each RTU can continue to monitor while the simulation or diagnostic is running.

Configuration of the RTU can occur by use of a configuration tool ARME that can reside on the computers or on the enterprise server.

The ARME can configure the RTU through the AES.

According to the method, the RTU can run diagnostic tests as directed by the enterprise servers based on instruction via the AES.

The communication software can be adapted to simultaneously handle multiple types of telemetry for communication with different devices, the cryptographic module and other metering devices. For instance, devices can be SCADA devices, metering devices, a programmable logic controller, a different programmable controller, a physical sensor, a state sensor, or a second remote terminal unit.

The communication software can contain computer instructions for transmitting the data from these devices over a network. The remote terminal unit can have similar computer instructions in the data storage of the remote terminal unit for transmitting data from the device to the one or more enterprise servers.

The communication software can be adapted to simultaneously handle different communication protocols, which are referred to herein as "device protocols" of various devices from different manufactures.

In embodiments, the communication software can have a feature, such as computer instructions to initiate an alarm when the information collected by the sensors in the RTU of a device signifies the device is about to exceed preset values.

The method can include using communication software, which can permit continuous communication for 24 hours a day, 7 days a week with the devices.

The communication software can allow a second enterprise server to be added or removed from the SCADA system while the SCADA system with the first enterprise server continues to operate.

The configuration software referred to herein as "ARME" can be added for configuring and reconfiguring the RTU, the cryptographic module, or both simultaneously while the overall SCADA system continues to operate, adding devices, creating automatic custom licenses, deleting devices, monitoring and tracking data.

Other forms of communication can also be possible including acoustic signal, radio frequency, or combinations thereof.

The communication software can be adapted to simultaneously handle multiple types of telemetry and different protocols of other devices from various manufacturers.

Turning now to the Figures, FIG. 1 shows a schematic of a communication and configuration equipment according to one or more embodiments of the method.

The method can use communication and configuration equipment 1 and an enterprise server 10, which can receive requests for a license from a client device 39 to add or delete at least one field device 20*a*, 20*b*, and 20*c*. The field devices can collect and transmit status and measurement data.

Status and measurement data can include but is not limited to: current operational information on at least one field device, operational information received from at least one field device, or combinations thereof. The operational information from one or more field devices, from one or more cryptographic modules, or combinations thereof. The operational information can include but is not limited to: pressure data, temperature data, flow data, maintenance repair data, battery limit data, entry detection information for an enclosure, leak detection data, equipment run times, plant conditions, and combinations thereof.

The enterprise server 10 can collect data and send messages and commands to at least one of the field devices.

The enterprise server 10 can have a processor 2 in communication with a network 58 and a data storage 3 in communication with the processor.

The processor can be a computer, a laptop, a tablet computer, a smart phone or cellular phone, or any known device in the industry capable of bidirectional communication over a network.

In embodiments, the method can include using the client device 39 for communication with the network 58. The client device 39 can be a computer, a laptop, a smart phone or a cellular phone, a tablet computer, or any similar device known in the industry for communication and processing data.

In embodiments, the network 58 can be a satellite network, a global communication network, a cellular network, an acoustic signal network, a radio frequency network, a known network in the industry, or combinations thereof.

The client device 39 can have a client device processor 41 in communication with a client device data storage 43. Client software 37 can reside in the client device data storage, which can enable a human machine interface to communicate with the enterprise server 10. In embodiments, alarms 84 can be stored in the client device data storage and presented to a display of the client device.

The method can include connecting a plurality of field devices 20*a*, 20*b*, 20*c* with the network 58. Each field device can have a communication protocol 36*a*, 36*b*, 36*c*.

In embodiments, the plurality of field devices 20*a*, 20*b*, 20*c* can be monitoring devices, detection devices, metering devices, tracking devices, bar code readers, remote terminal units, programmable logic controllers, wearable computers, and physical property sensors.

For implementation of the method, a usable enterprise server 10 can have random access memory as the data storage. The random access memory can be in a computer that acts as the processor. The random access memory can store the computer instructions described herein.

The enterprise server 10 can monitor the plurality of field devices 20a, 20b, 20c and use and monitor or just monitor at least one intelligent cryptographic module 22.

In embodiments of the method, the enterprise server 10 can be in communication with a second enterprise server. The enterprise servers can be in parallel or series with one another.

The enterprise server can communicate with a metering device, a programmable logic controller (PLC), a programmable controller, a remote terminal unit, a state sensor, or combinations thereof.

In embodiments, multiple enterprise servers can also communicate with the plurality of field devices simultaneously.

In embodiments of the method, the enterprise servers can communicate directly or indirectly with the plurality of field devices 20a, 20b, 20c. The plurality of field devices 20a, 20b, and 20c can have a second type of device within it. The second type of device can be a meter, a PLC, a supervisory control and data acquisition device, or a remote terminal unit. For example, the second type of device can be a supervisory control and data acquisition device.

In embodiments, a first enterprise server can communicate with field devices and at least one intelligent cryptographic module while a second enterprise server is added to or removed from the system.

The at least one intelligent cryptographic module 22 can communicate with the plurality of field devices 20a, 20b, 20c providing a first encrypted communication link 21a between the at least one field device and the intelligent cryptographic module and a second encrypted communication link 21b between the intelligent cryptographic module and the enterprise server.

In embodiments, the at least one intelligent cryptographic module 22 can provide authentication of the plurality of field devices 20a, 20b, 20c by exchanging ANSI X.509 certificates between each of the plurality of field devices 20a, 20b, 20c and an object, generating a public key to authenticate an owner of an ANSI X.509 certificate, generating a symmetric session key for session initiation and continuing communication between each of the plurality of field devices 20a, 20b, 20c and the enterprise server 10 through at least one intelligent cryptographic module 22.

In embodiments, the at least one intelligent cryptographic module 22 can be a secure enclosure with a cryptographic module processor disposed within the secure enclosure. A cryptographic module data storage can be in communication with the cryptographic module processor, which can have a cryptographic application programming interface, wherein the cryptographic module processor is adapted to authenticate the enterprise server, be authenticated by the enterprise server, and provide encrypted and non-encrypted communication between the enterprise server and the plurality of field devices.

The at least one intelligent cryptographic module 22 can include computer instructions in the cryptographic module data storage for instructing the cryptographic module processor to receive at least one encrypted message from the enterprise server, receive at least one non-encrypted message from the enterprise server, receive at least one encrypted message from each of the plurality of field devices, receive at least one non-encrypted message from each of the plurality of field devices, decrypt at least one encrypted message forming at least one decrypted message, encrypt at least one non-encrypted message forming at least one encrypted response, and transmit the message encrypted by the at least one intelligent cryptographic module 22 to either the enterprise server 10 or the field device 20a, 20b, 20c, and transmit the decrypted message decrypted by the at least one intelligent cryptographic module 22 to either the enterprise server or the plurality of field devices.

The at least one intelligent cryptographic module 22 can include at least one port connected to the cryptographic module processor for receiving and transmitting at an encrypted message, a decrypted message, a non-encrypted message, and combinations thereof.

In embodiments, the enterprise server 10 can have a configurable server interface. The configurable server interface can receive client requests.

A configurable protocol interface can be in communication with online configurable communication server software.

The configurable protocol interface can be used to build a message. The message can be issued using a plurality of device protocols. For example, one or more field devices in communication with the enterprise server can communicate via a first device protocol and one or more field devices in communication with the enterprise server can communicate via a second device protocol. The configurable protocol interface can support a plurality of device protocols simultaneously.

A configurable connection interface can be used to connect one or more devices, intelligent cryptographic modules, or combinations thereof to the enterprise server.

The enterprise server 10 can have integrated online licensing software, which can automatically create a customized license simultaneously while the enterprise server operates.

The enterprise server 10 can have communication software linking the enterprise server 10 with the plurality of field devices, cryptographic modules, or combinations thereof. The communication software can be adapted to simultaneously handle multiple types of telemetry and different device protocols associated with the field devices, cryptographic modules, or combinations thereof.

The enterprise server 10 can also have configuration software. The configuration software can be used to configure and reconfigure one or more of the devices, the intelligent cryptographic modules, the remote terminal units, or combinations thereof. The configuration software can provide commands communicated using the communication software while allowing the system to continue to operate.

In embodiments, the enterprise server can contain a remote terminal unit (RTU).

In embodiments, a cache can be created to store the status and measurement data in the memory of the server. The cache can be in communication with the client application through the configurable server interface.

In embodiments, the method can include alarms, which can be transmitted based on certain changes in state or changes in physical condition of at least one field device.

The enterprise server can include computer instructions to initiate the alarms 84. The computer instructions can be integrated with or within the client software 37, the online configuration communication server software, or combinations thereof or otherwise associated with the enterprise server 10. The computer instructions to initiate the alarms can sound an alarm when a change in state occurs or a physical condition exceeds or does not meet a preset value.

The method can include authenticating one or more cryptographic modules. The enterprise server 10 can also include computer instructions for authentication. The computer instruction for authentication can be used to authenticate one or more cryptographic modules by exchanging certificates.

The enterprise server 10 can also include computer instructions for public key encryption. The computer instructions for public key encryption can enable sharing of a cryptographic key with one of the cryptographic modules.

The enterprise server 10 can have computer instructions for communication session initiation and continuing communication with a symmetric encryption key.

The enterprise server 10 can include computer instructions to request the status and the measurement data from one of the devices, cryptographic modules, or combinations thereof, at defined time intervals.

The enterprise server 10 can also include computer instructions to transmit the cached status and measurement data to a client application.

The enterprise server 10 can also include computer instructions for performance monitoring, which identifies and tracks a member of the group consisting of: software errors; communication errors; security parameters to track changes in registration keys, symmetric keys, public keys, or combinations thereof; errors occurring with the configurable protocol interface; errors occurring with the configurable connection interface as communication occurs with each device, cryptographic module, or combinations thereof; cryptographic module errors and combinations thereof.

The enterprise server 10 can also have computer instructions for totalizing errors. The computer instructions for totalizing errors can be used to calculate or track errors in at least one field device, the cryptographic module, the enterprise server, or combinations thereof.

The enterprise server 10 can also include computer instructions for allowing client initiated modifications to the configurable server interface during the enterprise server operation.

The enterprise server 10 can include computer instructions to allow client initiated modifications to the online configurable communication server software during enterprise server operation.

A configurable logging interface with the online configurable communication server software for communicating to a software logging program can be included on the enterprise server 10. The configurable logging interface can track and display errors occurring in a channel or with each device, cryptographic module, or combinations thereof, and then storing the tracked and viewed errors.

Figure 2B:
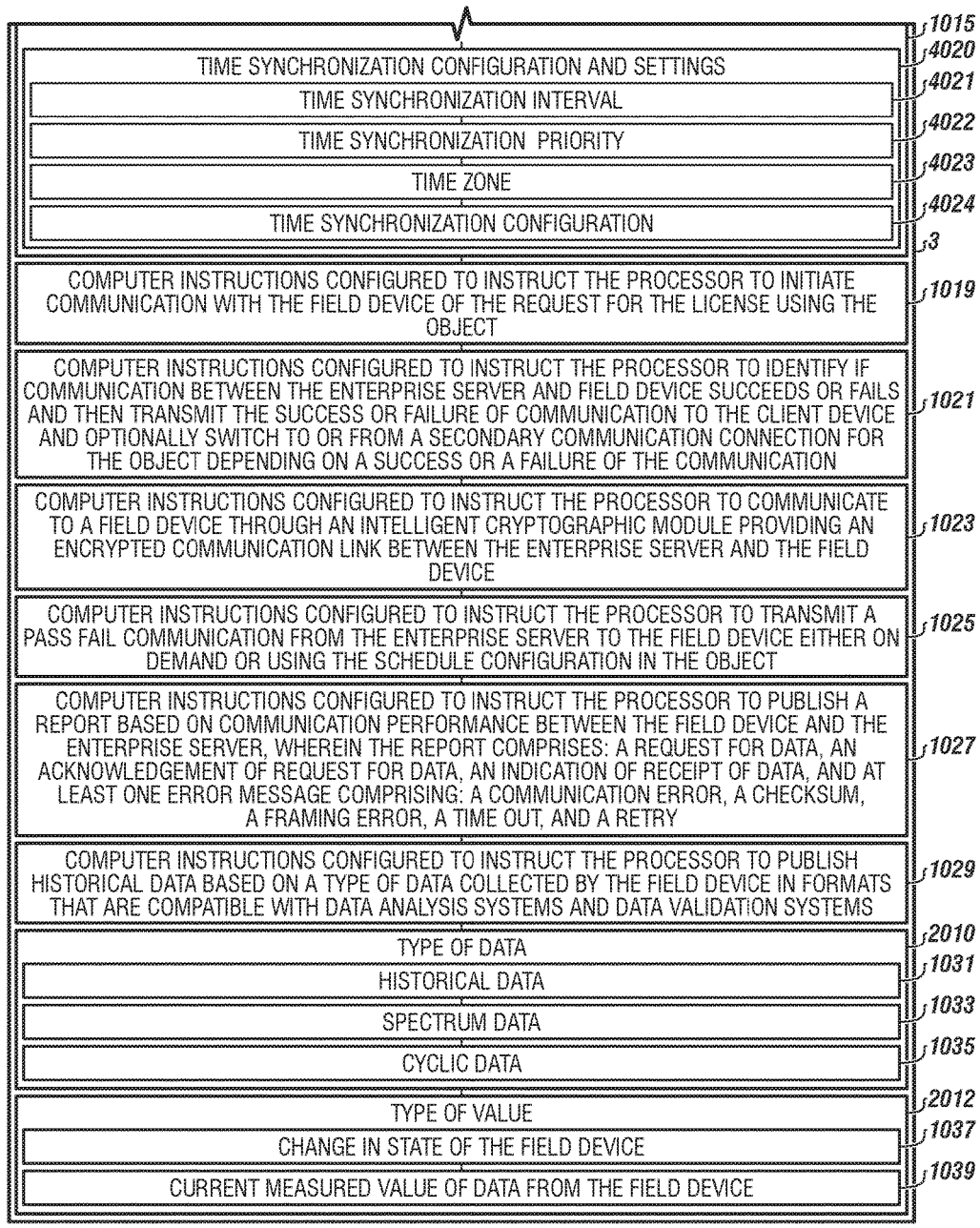

FIGS. 2A-2B show a diagram of the data storage with computer instructions to implement the method according to one or more embodiments.

The data storage 3 can have computer instructions 1004 configured to instruct the processor to display a licensing menu, when the enterprise server receives a request for a license from a client device for bidirectional communication between a field device and the enterprise server using a communication protocol of the field device.

The data storage 3 can contain the licensing menu 1005.

The data storage 3 can contain computer instructions 1007 configured to instruct the processor to receive and store a request for a license comprising an install ID, a HOSTNAME, a MAC, and a volume ID.

The data storage 3 can contain computer instructions 1009 configured to instruct the processor to generate a license for a field device and store the license in the data storage.

The license can include an install value for the install ID, a hostname value for the HOSTNAME, a MAC value for the MAC, a volume ID value for the volume ID, a device count value, an indication of type of data from the field device, and an indication of type of value for the field device.

The data storage 3 can also include computer instructions 1010 configured to instruct the processor to generate a symmetric encryption key and store the symmetric encryption key in the data storage.

In embodiments, the data storage 3 can contain the symmetric encryption key 1011 and the license 1012.

The data storage 3 can contain computer instructions 1013 configured to instruct the processor to generate an object with an object name and the communication protocol of the field device and store the object in the data storage.

The object 1015 can have the communication protocol 36 of the field device, an object name 1017, a primary communication path 4004, a secondary communication path 4005 for the object depending on a success or a failure of the communication using the primary communication path, a schedule configuration 4006 for scheduling communication with the field device, and a communication status indicator 4011.

The schedule configuration 4006 can have a periodic communication 4007, a date of a communication 4009 that can include a name of a month, a year, and a day of the month, and a time of communication 4013, which has a start time and an end time.

The object 1015 can contain a diagnostic logging module 4012. The diagnostic logging module can be used for tracking communication and other activity between the object and the field device.

The object 1015 can contain a logging for data collection module 1014. The logging for data collection module can be used for analyzing communication performance between the object and the field device, The object 1015 can also contain an alias label 4016 for labelling values from the field device and an unsolicited communication 4018 from a field device.

The object 1015 can have a time synchronization configuration and settings 4020. The time synchronization configuration and settings can be used to synchronize field devices with the enterprise server.

In embodiments, the time synchronization configuration and settings 4020 can include a time synchronization interval 4021, a time synchronization priority 4022, a time zone 4023, and a time synchronization configuration 4024.

The data storage 3 can contain computer instructions 1019 configured to instruct the processor to initiate communication with the field device of the request for the license using the object.

The data storage 3 can contain computer instructions 1021 configured to instruct the processor to identify if communication between the enterprise server and field device succeeds or fails and then transmit the success or failure of communication to the client device and optionally switch to or from a secondary communication path for the object depending on a success or a failure of the communication.

The method can include licensing and de-licensing of field devices while configuring and reconfiguring field devices online as status and measurement data from each licensed field device is collected using the communication protocol of each field device without stopping operational functions of the enterprise server supporting the object and simultaneously providing types of data and types of values of data between the field devices and the enterprise server to client devices.

The data storage 3 can also include computer instructions 1023 configured to instruct the processor to communicate to any field device through an intelligent cryptographic module providing an encrypted communication link between the enterprise server and the field device.

The data storage 3 can include computer instructions 1025 configured to instruct the processor to transmit a pass or fail communication from the object to the field device either on demand or using the schedule configuration.

The data storage 3 can include computer instructions 1027 configured to instruct the processor to publish a report based on communication performance between the field devices and the enterprise server, wherein the report comprises: a request for data, an acknowledgement of request for data, an indication of receipt of data, and at least one error message comprising: a communication error, a checksum, a framing error, a time out, and a retry.

The data storage 3 can contain computer instructions 1029 configured to instruct the processor to publish historical data based on a type of data collected by the field device in formats that are compatible with data analysis systems and data validation systems.

In embodiments, the type of data can be pressure data, temperature data, flow data, maintenance repair data, battery limit data, entry detection information for an enclosure, leak detection data, equipment run times, plant conditions, and combinations thereof.

The type of data 2010 can be at least one of: historical data 1031 showing data and time of measurements, spectrum data 1033 depicting vibration and frequency data and cyclic data 1035 showing measurements based on a predetermined timed interval. Cyclic data, as an example, can include data from a pump off controller for an oil well that is producing. One cycle is term "a card" and is viewed in the industry to be cyclic data.

The data storage 3 can store the indication of type of value 2012 as at least one of: a change in state of the field device 1037 and a current measured value of data from the field device 1039.

Figure 3:
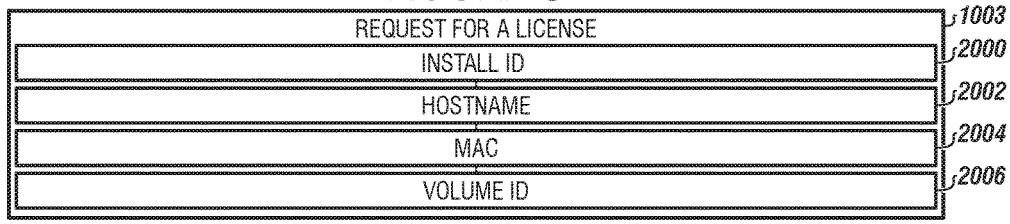
FIG. 3 depicts an exemplary request for a license according to one or more embodiments.

FIG. 3 depicts an exemplary request for a license according to one or more embodiments of the method In embodiments, the request for a license 1003 can be made from the client device.

The request for a license 1003 can include an install ID 2000, a HOSTNAME 2002, a MAC 2004 and a VOLUME ID 2006.

Figure 4:
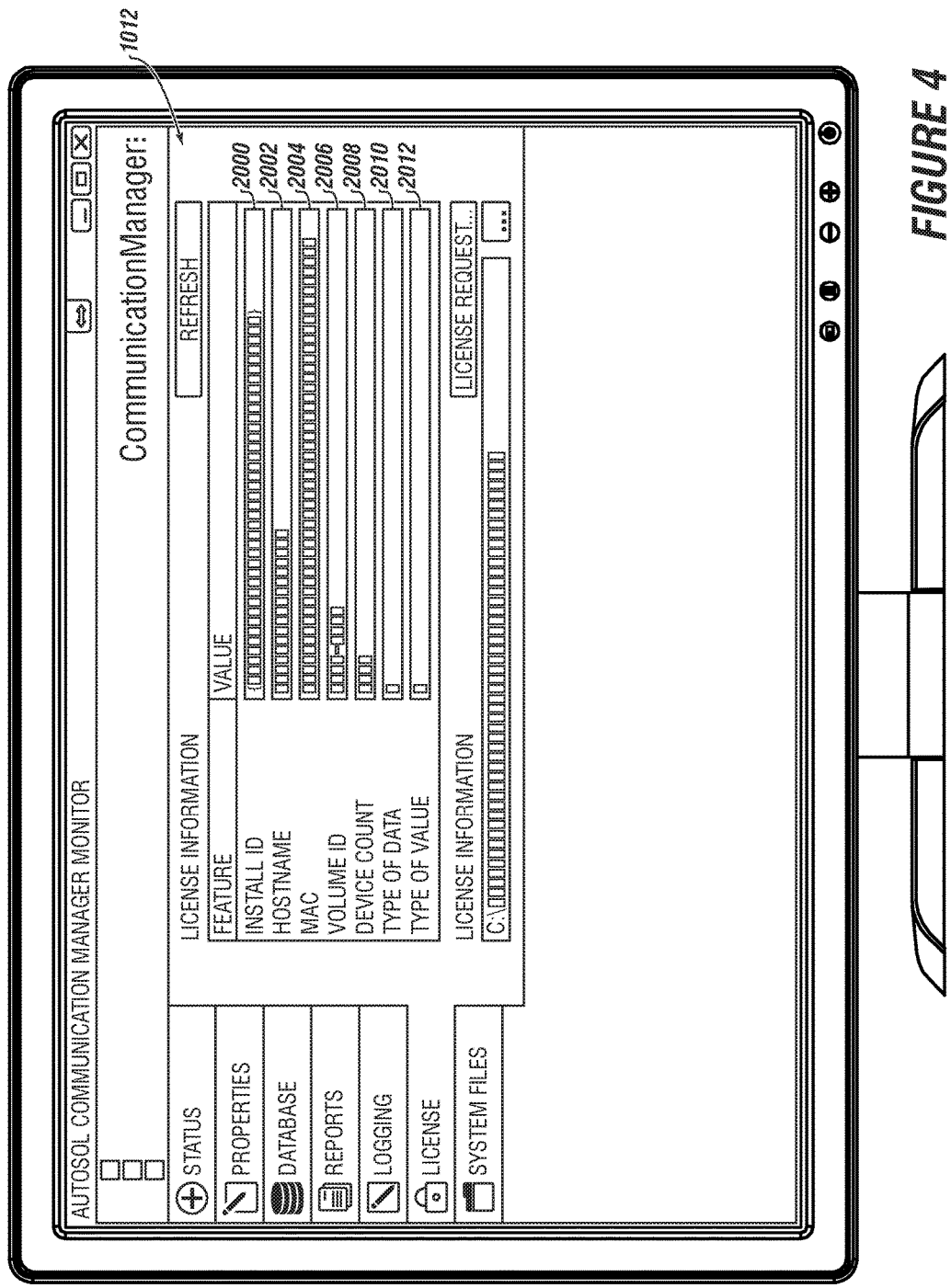
FIG. 4 depicts a license and license information according to one or more embodiments.

FIG. 4 depicts a license with license information generated according to one or more embodiments of the method.

The license 1012 can have a licensing menu screen, which can show the reply from the enterprise server to the request for the license by providing an install value for the install ID 2000, a hostname value for the HOSTNAME 2002, a mac value for the MAC 2004, a volume ID value for the volume ID 2006, a device count value 2008 for a device count, an indication of type of data 2010 from the field device, and an indication of type of value 2012 for the field device.

The integrated online licensing software of the enterprise server can have computer instructions to provide a licensing menu comprising choices to: initiate the license to modify a data item of the license or a device count of the license, uninstall the license, or combinations thereof.

The online licensing software can produce a symmetric encryption key. The symmetric encryption key can enable the field device of the license to initiate communication with the enterprise server automatically.

The online licensing software can contain modifiable license templates, which can be changed to create a license for: a quantity of field devices to be licensed, a quantity of status and measurement data to be licensed, a defined calendar period, or combinations thereof.

Figure 5:
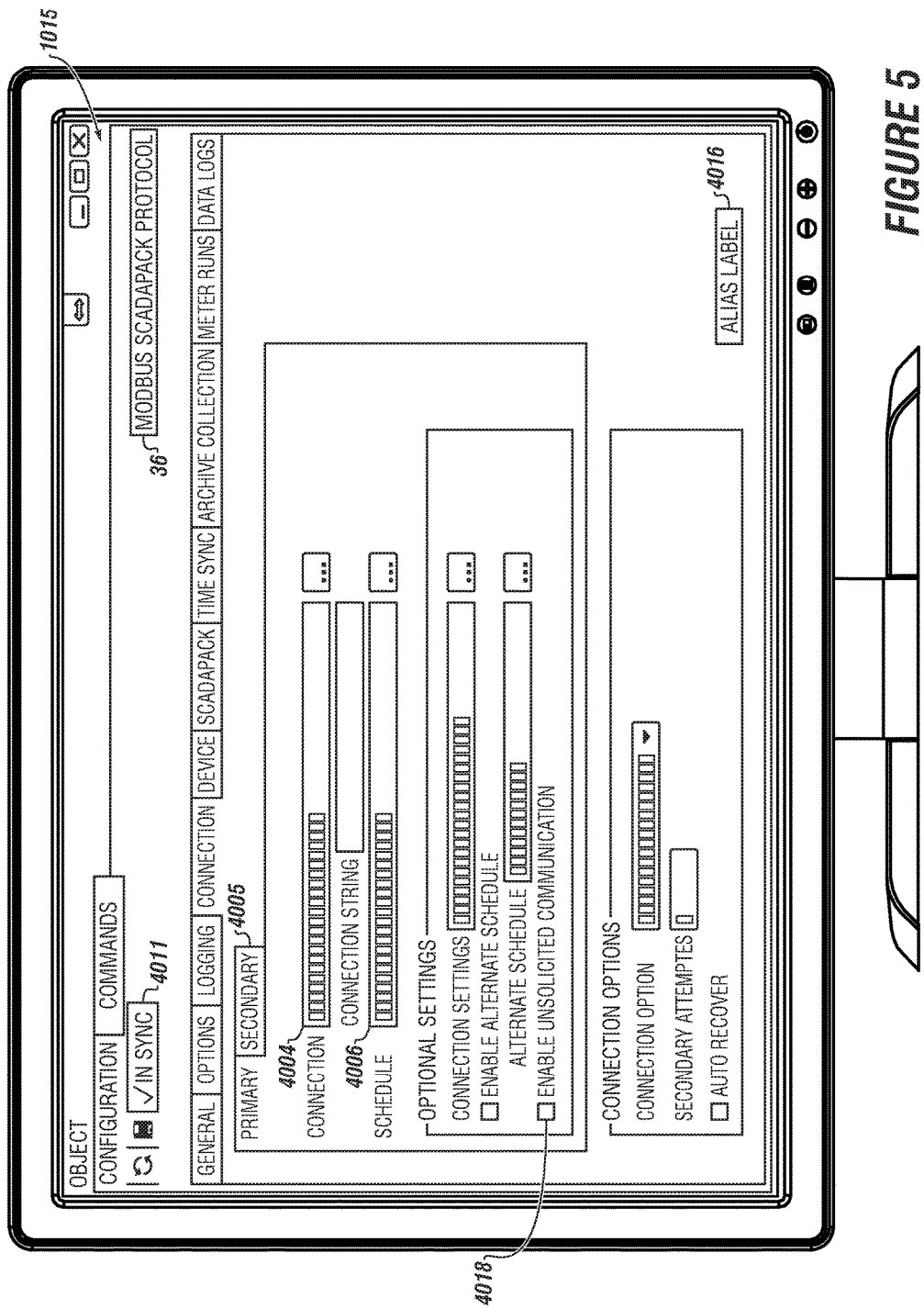
FIG. 5 depicts elements of an object according to one or more embodiments.

FIG. 5 depicts elements of an object according to one or more embodiments.

The object 1015 can have the communication protocol 36 of the field device shown here as MODBUS SCADAPACK PROTOCOL.

The object 1015 can have a primary communication path 4004 with a connection string, a schedule configuration 4006 for scheduling communication with the field device, and a secondary communication path 4005 is shown and can be clicked on to view additional information.

The communication status indicator 4011 is shown with a checkmark that the field device is "in sync" with the enterprise server.

The object can have an unsolicited communication 4018 from a field device option that is not enabled and an alias label 4016 for labelling values from the field device.

Figure 6:
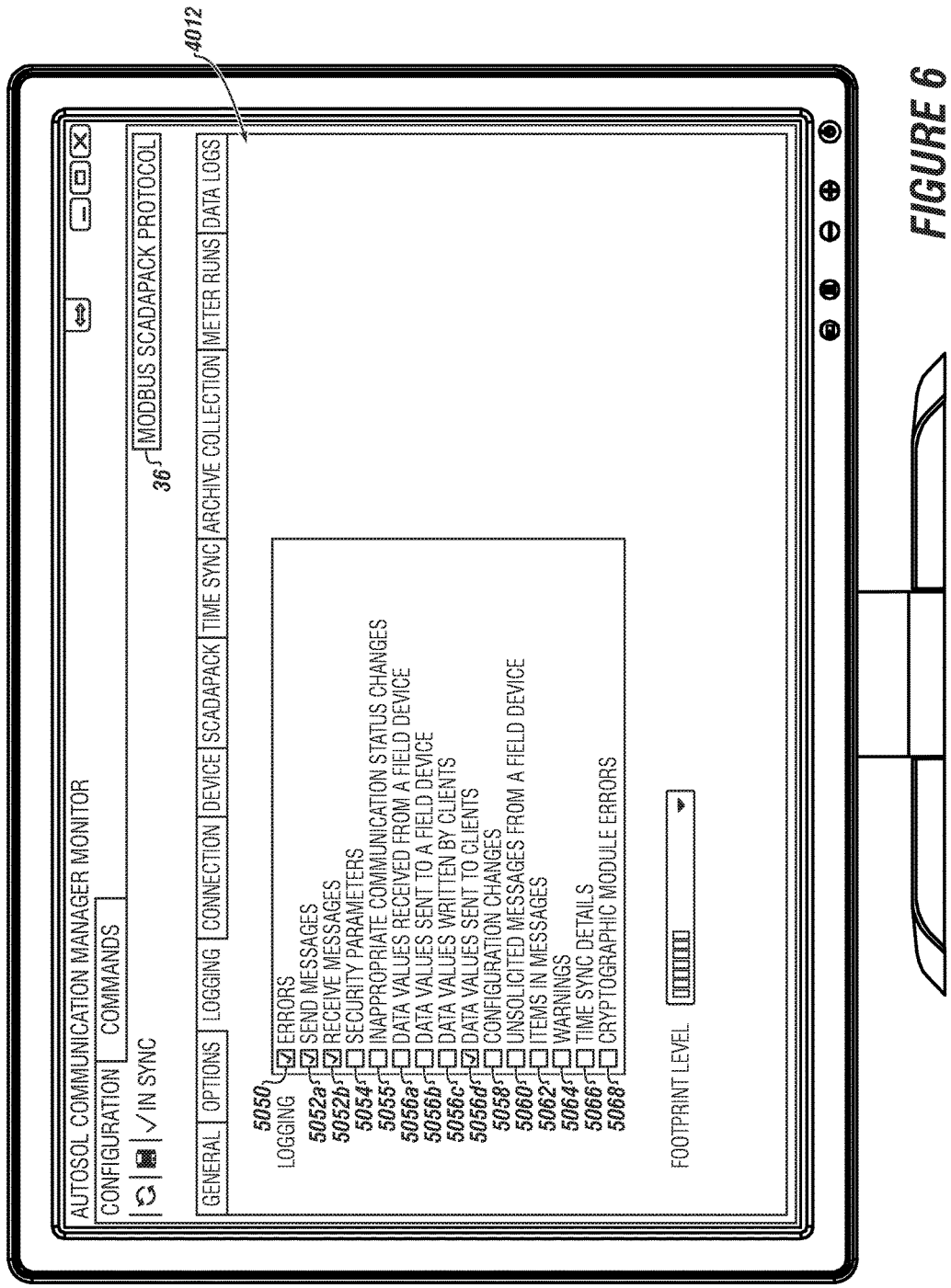
FIG. 6 depicts a diagnostic logging module for tracking communication and other activity between the object and the field devices usable with the method according to one or more embodiments.

FIG. 6 depicts a diagnostic logging module for tracking communication and other activity between the object and the field devices according to one or more embodiments.

The diagnostic logging module 4012 can track one or more of the following: errors 5050, send messages 5052a, receive message 5052b, security parameters 5054 to track changes in registration keys, symmetric keys, public keys, or combinations thereof, inappropriate communication status changes 5055 indicating a security breach, data values received from a field device 5056a, data values sent to a field device 5056b, data values written by clients 5056c, data values sent to clients 5056d, configuration changes 5058 as communication occurs with the field device, cryptographic module, or combinations thereof, unsolicited messages from a field device 5060, items in messages 5062, warnings 5064, time sync details 5066, such as commands, and cryptographic module errors 5068. The diagnostic logging module 4012 can also track the communication protocol 36 of the field device.

Figure 7:
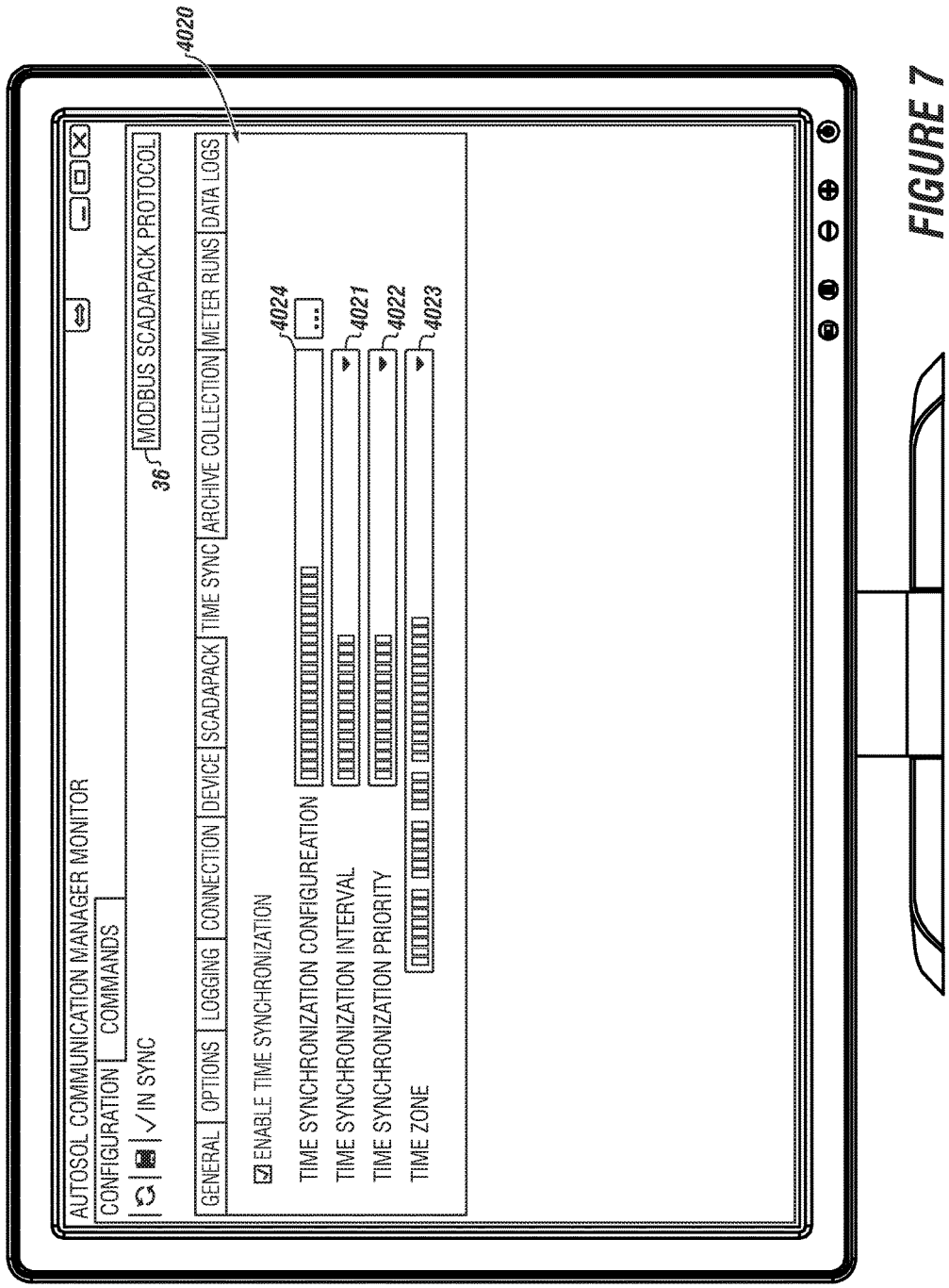
FIG. 7 depicts a time synchronization configuration and settings to synchronize field devices with the enterprise server usable with the method according one or more embodiments.

FIG. 7 depicts a time synchronization configuration and settings to synchronize field devices with the enterprise server according to one or more embodiments of the method.

The time synchronization configuration and settings 4020 can be used to synchronize field devices with the enterprise server and the communication protocol 36.

The time synchronization configuration and settings 4020 can include at least one of:

a time synchronization interval 4021, a time synchronization priority 4022, a time zone 4023, such as Eastern Standard Time, and a time synchronization configuration 4024.

Figure 8:
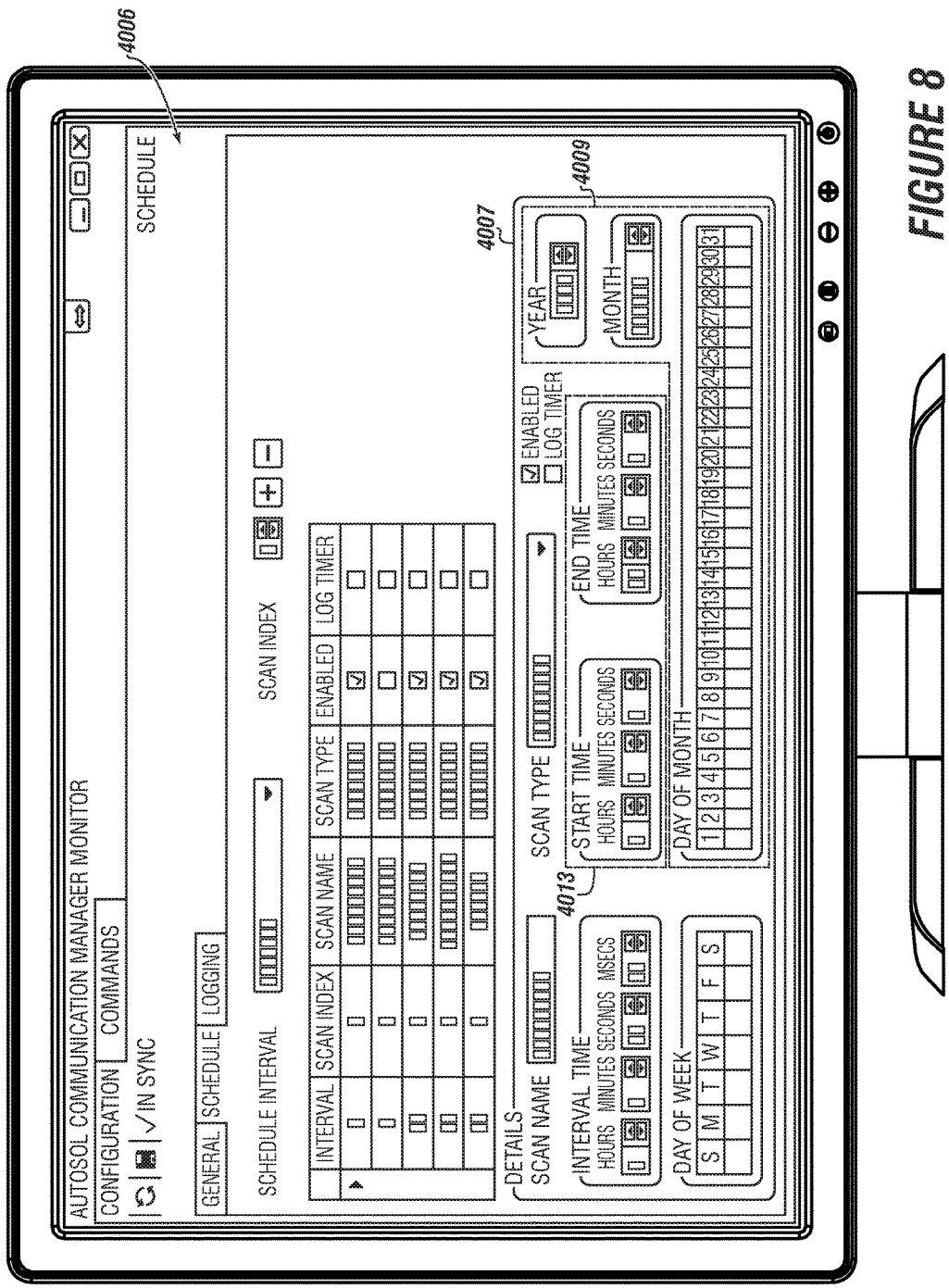
FIG. 8 depicts a schedule configuration usable with the method according to one or more embodiments.

FIG. 8 depicts a schedule configuration according to one or more embodiments.

The schedule configuration 4006 for periodic communicating with the field device, wherein the schedule configuration can include at least one of: a periodic communication 4007, a date of a communication 4009 comprising a month, a year, and a day of the month, and a time of communication 4013 comprising a start time and an end time.

Figure 9:
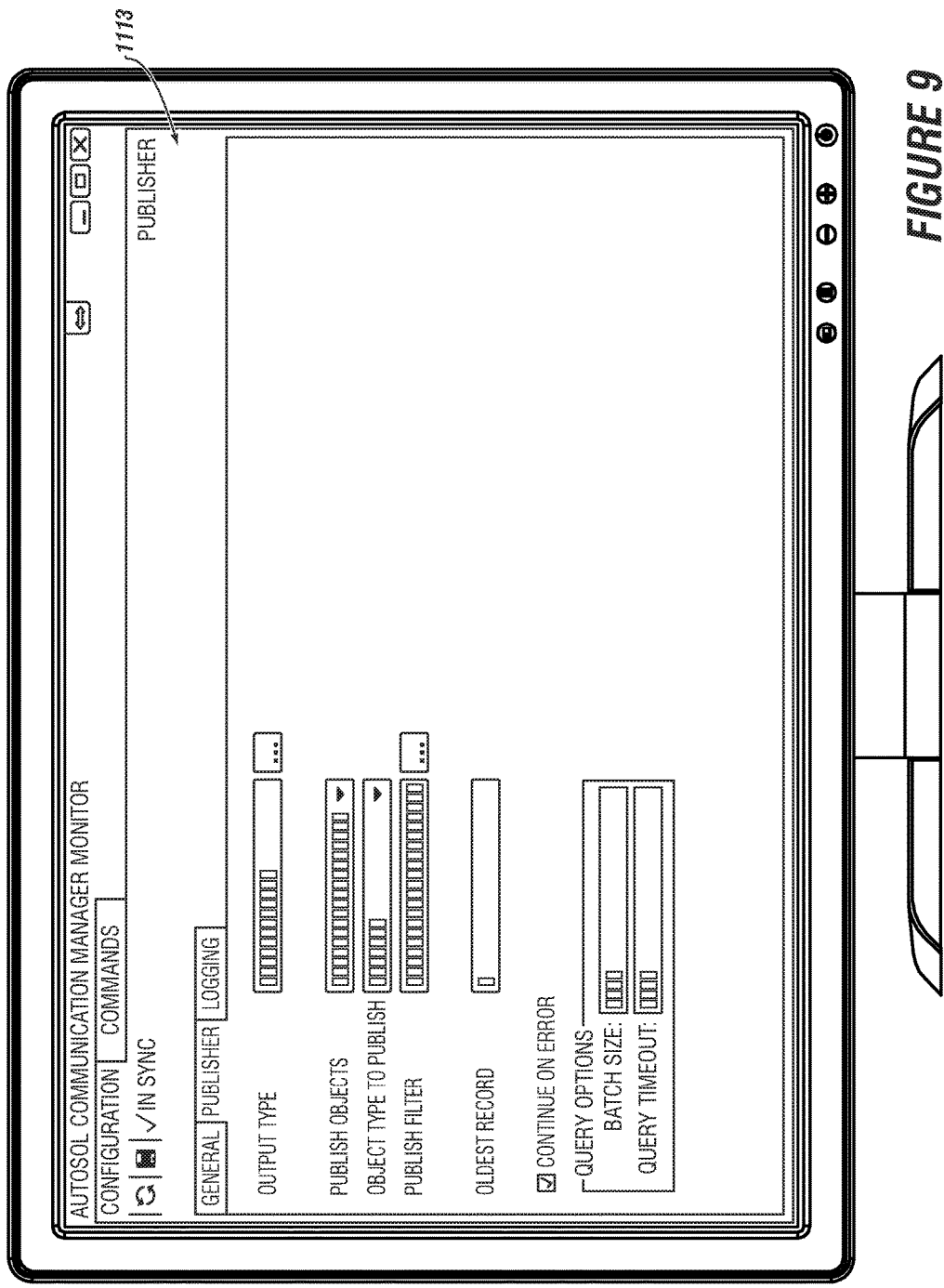
FIG. 9 depicts a report module usable according to one or more embodiments.

FIG. 9 depicts a report module according to one or more embodiments.

The communication and configuration system can include a report module 1113.

The report module 113 can show output type for a report, an indicator to publish generated objects, an indicator to show which type of object to publish, a publish filter to hold back certain information in the report, a listing value to show which record to list first, and other options.

The report can include a request for data, an acknowledgement of request for data; an indication of receipt of data, and at least one error message comprising: a communication error, a checksum, a framing error, a time out, and a retry.

As an example, the output types for the report can be selected from: FLOWCAL™ CFX 5, FLOWCAL™ CFX 7, FLOWCAL™ CFX 8, Comma-separated variable (CSV), MICROSOFT® SQL, ORACLE® and other databases, PGAS XML, AUTOS OL™ XML, and AUTOSOL™ EFM.

Figure 10:
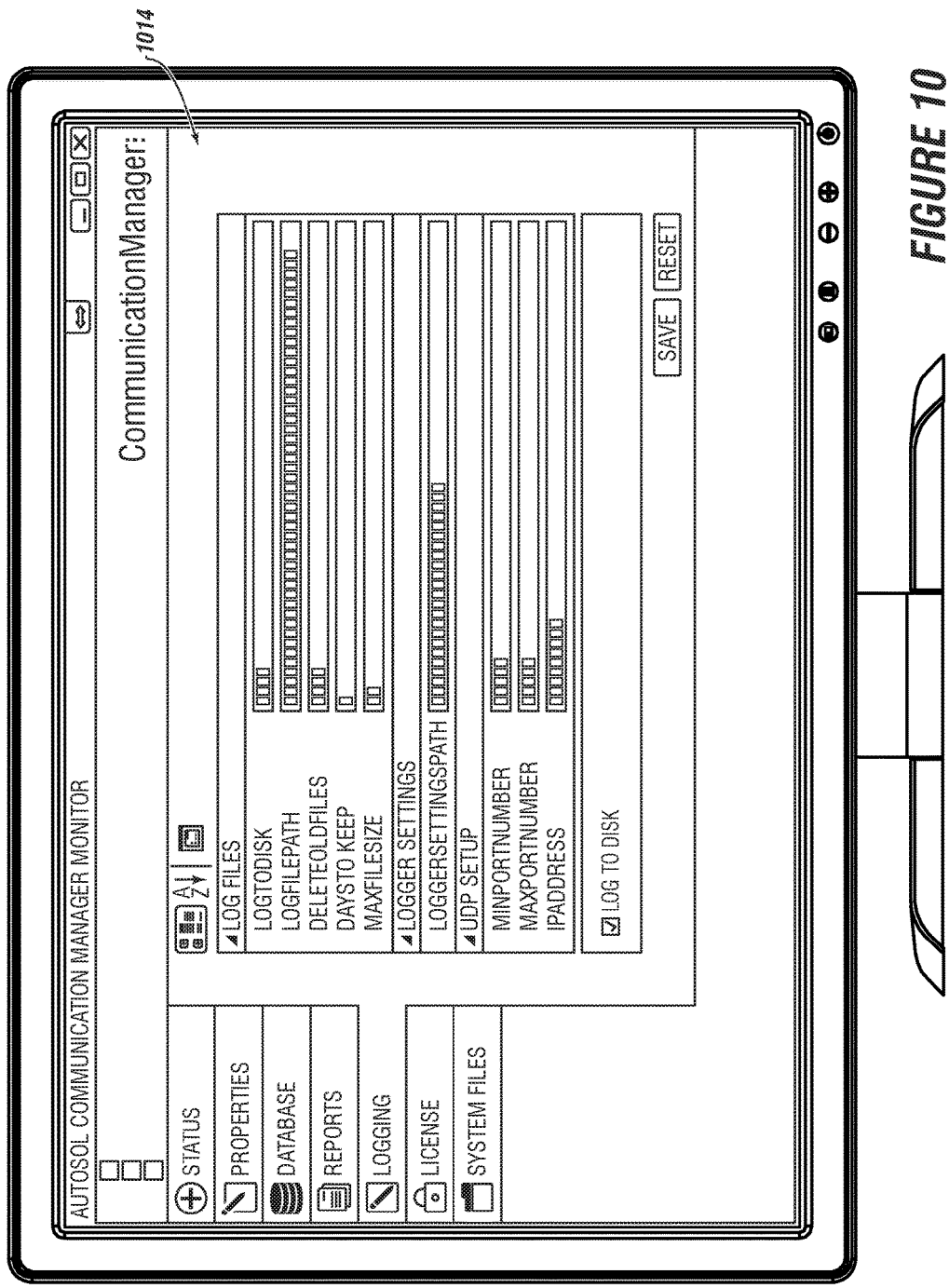
FIG. 10 depicts a logging for data collection module usable with the method according to one or more embodiments.

FIG. 10 depicts a logging module according to one or more embodiments.

The logging for data collection module 1014 can be used for analyzing communication performance between the object and the field device.

The logging for data collection module 1014 can track log to disk values, the log file path, the quantity of deleted old files, provide a value on days to keep files, and provide an indicator on max file size. Additionally, the logging for data collection module can provide logger settings, including a logger settings path. The UDP setup can be indicated including a miniport number, a maxport number and an IP address.

FIG. 11 depicts steps of the method according to one or more embodiments.

The method for online licensing of field devices using a SCADA system can include connecting an enterprise server to a network, shown in box 5000.

The method can include connecting a plurality of field devices to the network, as shown in box 5002.

The method can include receiving and storing a request for a license in the enterprise server, as shown in box 5004.

The method can include generating a license in response to the request for the license and storing the license in the data storage, as shown in box 5006.

In embodiments, the license can contain but is not limited to: a device count value, an indication of type of data from each of the plurality of field devices, and a value for each of the plurality field devices.

The method can include generating a symmetric encryption key using the device count value, the indication of type of data and the value of the license, and storing the symmetric encryption key in the data storage, as shown in box 5008.

The method can include generating an object in the enterprise server for each of the plurality of field devices and storing each object in the data storage, as shown in box 5010.

In embodiments, each object can have a communication protocol for each field device, an object name, a primary communication path, and a schedule configuration for scheduling communication with the plurality of field devices.

The method can include initiating communication with each of the plurality of field devices simultaneously through each object, as shown in box 5012.

The method can include identifying if communication between the enterprise server and each of the plurality of field devices succeeds or fails and optionally switching connection from a primary communication path to a secondary communication path between each object and each field device depending on a success or a failure of the communication, as shown in box 5014.

In embodiments, the method can provide licensing and de-licensing of the plurality of field devices while configuring and reconfiguring the plurality of field devices online as status and measurement data from each licensed field device is collected using the communication protocol of each of the plurality of field devices independently and without stopping operational functions of the enterprise server supporting each object while simultaneously providing types of data and values of data between the plurality of field devices and the enterprise server.

The method can include communicating to a portion of the plurality of field devices from at least one object through at least one intelligent cryptographic module providing an encrypted communication link between the object and each of the plurality of field devices communicating with at least one intelligent cryptographic module, as shown in box 5016.

The method can include transmitting a pass or fail communication from each object to each of the plurality of field devices either on demand or using the schedule configuration, as shown in box 5018.

The method can include publishing a report based on communication performance between each of the plurality of field devices and each object, as shown in box 5020.

The method can include publishing historical data based on a type of data collected by each of the plurality of field devices, as shown in box 5022.

The method can include transmitting a command from each object to each field device, wherein the command comprises at least one of: an actuation command, a deactivation command, a configuration command for online configuration, a reconfiguration command for online reconfiguration, and wherein each command is at least one of: an encrypted command and a command without encryption, as shown in box 5024.

In embodiments of the method, each of the plurality of field devices can be selected from a group consisting of at least one of: monitoring devices, detection devices, metering devices, tracking devices, bar code readers, remote terminal units, a virtual field device, programmable logic controllers, wearable computers, physical property measuring devices, such as Doppler measuring devices, acoustic measuring devices, laser measuring devices, and Coriolis meters, and other physical property sensors.

In embodiments of the method, by means of at least one intelligent cryptographic module, can involve providing authentication of each of the plurality of field devices by: exchanging ANSI X.509 certificates between each of the plurality of field devices and the object, generating a public key to authenticate an owner of an ANSI X.509 certificate; and generating a symmetric session key for session initiation and continuing communication between each of the plurality of field devices and the In embodiments, the method can involve receiving and storing a request for a license from the client device. The request for the license can identify at least one field device of the plurality of field devices and can include an install ID, a HOSTNAME, a MAC number or identification, and a volume ID.

A license can be generated for each of the plurality of field device and stored in the data storage. The license can include: an install value for the install ID, a hostname value for the HOSTNAME, a mac value for the MAC, a volume ID value for the volume ID, a device count value, an indication of type of data from each of the plurality of field devices, and an indication of type of value for each of the plurality field devices.

As with the prior embodiments, the method can include generating a symmetric encryption key and storing the symmetric encryption key in the data storage and generating the object in the enterprise server for each of the plurality of field devices and storing each object in the data storage.

In embodiments, the object can include a communication protocol of each of the plurality field devices, an object name, a primary communication path, a schedule configuration for scheduling communication with each of the plurality of field devices, and a communication status indicator.

The method can include initiating communication with each of the plurality field devices simultaneously through each object, identifying if communication between the enterprise server and each of the plurality field devices succeeds or fails and then transmitting the success or failure of communication to the client device, and optionally switching the connection from the primary communication path to the secondary communication path between each object and each of the plurality field devices depending on a success or a failure of the communication.

The method can provide licensing and de-licensing of the plurality field devices while configuring and reconfiguring the plurality of field devices online as status and measurement data from each licensed field device is collected using the communication protocol of each of the plurality of field devices independently and without stopping operational functions of the enterprise server supporting the object while simultaneously providing types of data and types of values of data between the plurality of field devices and the enterprise server to the client device.

While these embodiments have been described with emphasis on the embodiments, it should be understood that within the scope of the appended claims, the embodiments might be practiced other than as specifically described herein.

What is claimed is:

1. A method for communication and configuration of online field devices comprising:
   a. connecting an enterprise server to a network, the enterprise server comprising a processor in communication with the network and a data storage in communication with the processor;
   b. connecting a client device to the network, the client device having a client device processor in communication with a client device data storage;
   c. connecting a plurality of field devices to the network, each of the plurality of field devices having a communication protocol;
   d. receiving and storing a request for a license from the client device, wherein the request for the license identifies at least one field device of the plurality of field devices and the request comprises:
      (i) an install ID;
      (ii) a HOSTNAME;
      (iii) a MAC; and
      (iv) a volume ID;
   e. generating the license for each of the plurality of field devices in the request for the license and storing the license in the data storage, the license including:
      (i) an install value for the install ID;
      (ii) a hostname value for the HOSTNAME;
      (iii) a mac value for the MAC;
      (iv) a volume ID value for the volume ID;
      (v) a device count value;
      (vi) an indication of type of data from each of the plurality of field devices; and
      (vii) an indication of type of value for each of the plurality of field devices;
   f. generating a symmetric encryption key and storing the symmetric encryption key in the data storage;
   g. generating an object in the enterprise server for each of the plurality of field devices and storing the object in the data storage, the object comprising:
      (i) a communication protocol of each of the plurality of field devices;
      (ii) an object name;
      (iii) a primary communication path;
      (iv) a schedule configuration for scheduling communication with each of the plurality of field devices; and
      (v) a communication status indicator;
   h. initiating communication with each of the plurality of field devices simultaneously through the object;
   i. identifying if communication between the enterprise server and each of the plurality of field devices succeeds or fails and then transmitting the success or the failure of communication to the client device and optionally switching connection from the primary communication path to a secondary communication path between the object and each of the plurality of field devices depending on a success or a failure of the communication; and
   j. providing licensing and de-licensing of each of the plurality of field devices while configuring and reconfiguring each of the plurality of field devices online as status and measurement data from each licensed field device is collected using the communication protocol of each of the plurality of field devices independently and without stopping operational functions of the enterprise server supporting the object while simultaneously providing types of data and types of values of data between each of the plurality of field devices and the enterprise server to the client device.

2. The method of claim 1, comprising communicating to a portion of the plurality of field devices from the object through at least one intelligent cryptographic module providing an encrypted communication link between the object and each of the plurality of field devices communicating with the at least one intelligent cryptographic module.

3. The method of claim 2, wherein the at least one intelligent cryptographic module provides authentication of each of the plurality of field devices by:
   a. exchanging an ANSI X.509 certificate between each of the plurality of field devices and the object;
   b. generating a public key to authenticate an owner of the ANSI X.509 certificate; and
   c. generating a symmetric session key for session initiation and continuing communication between each of the plurality of field devices and the enterprise server through the at least one intelligent cryptographic module.

4. The method of claim 2, wherein the at least one intelligent cryptographic module comprises:
   a. a secure enclosure;
   b. a cryptographic module processor disposed within the secure enclosure;
   c. a cryptographic module data storage in communication with the cryptographic module processor comprising:
      (i) a cryptographic application programming interface, wherein the cryptographic module processor is adapted to:
         1. authenticate the object;
         2. be authenticated by the object; and
         3. provide encrypted and non-encrypted communication between the object and each of the plurality of field devices;
      (ii) computer instructions for instructing the cryptographic module processor to:
         1. receive at least one encrypted message from the object;
         2. receive at least one non-encrypted message from the object;
         3. receive at least one encrypted message from each of the plurality of field devices;

4. receive at least one non-encrypted message from each of the plurality of field devices;
5. decrypt at least one encrypted message forming at least one decrypted message;
6. encrypt at least one non-encrypted message forming at least one encrypted response;
7. transmit the message encrypted by the at least one cryptographic module to either the object or each of the plurality of field devices; and
8. transmit the decrypted message decrypted by the at least one cryptographic module to each of the plurality of field devices or the object; and d. at least one port connected to the cryptographic module processor for receiving and transmitting at least one of:
(i) an encrypted communication;
(ii) a decrypted communication; and
(iii) a non-encrypted communication.

5. The method of claim 1, comprising transmitting a pass or a fail communication from the object to each of the plurality of field devices either on demand or using the schedule configuration.

6. The method of claim 1, comprising publishing a report based on communication performance between each of the plurality of field devices and the object.

7. The method of claim 1, comprising publishing historical data based on a type of data collected by each of the plurality of field devices.

8. The method of claim 1, comprising transmitting a command from the object to each of the plurality of field devices, wherein the command comprises at least one of: an actuation command, a deactivation command, a configuration command for online configuration, a reconfiguration command for online reconfiguration, and wherein each command is at least one of: an encrypted command and a command without encryption.

9. The method of claim 1, wherein generating the object includes generating at least one of:
a. a diagnostic logging module for tracking communication and other activity between the object and each of the plurality of field devices;
b. a report module for providing reporting functions of collected data;
c. a logging for data collection module for analyzing communication performance between the object and each of the plurality of field devices;
d. an alias label for labelling values from each of the plurality of field devices;
e. an unsolicited communication from each of the plurality of field devices; and
f. a time synchronization configuration and settings to synchronize each of the plurality of field devices with the enterprise server, the time synchronization configuration and settings comprising at least one of:
(i) a time synchronization interval;
(ii) a time synchronization priority;
(iii) a time zone; and
(iv) a time synchronization configuration.

10. The method of claim 9, wherein the diagnostic logging module tracks at least one of:
a. errors;
b. messages;
c. security parameters to track changes in registration keys, the symmetric session keys, public keys, or combinations thereof;
d. inappropriate communication status changes indicating a security breach;
e. data values;
f. configuration changes;
g. cryptographic module errors;
h. unsolicited messages from each of the plurality of field devices; and
i. time sync detail commands.

11. The method of claim 1, wherein generating the schedule configuration for periodically communicating with each of the plurality of field devices includes generating at least one of:
a. a periodic communication;
b. a date of a communication comprising: a month, a year, and a day of the month; and
c. a time of communication comprising: a start time and an end time for the object.

12. The method of claim 1, wherein each of the plurality of field devices is selected from a group consisting of at least one of: monitoring devices, detection devices, metering devices, tracking devices, bar code readers, remote terminal units, a virtual field device, programmable logic controllers, wearable computers, physical property measuring devices and physical property sensors.

13. The method of claim 1, wherein the network is a member selected from a group consisting of at least one of: a satellite network, a global communication network, a cellular network, an acoustic signal network, and a radio frequency network.

14. The method of claim 1, wherein the type of data is a member of the group consisting of: pressure data, temperature data, flow data, maintenance repair data, battery limit data, entry detection information for an enclosure, leak detection data, equipment run times, plant conditions, and combinations thereof.

* * * * *